US008582875B2

(12) United States Patent
Cheddad et al.

(10) Patent No.: US 8,582,875 B2
(45) Date of Patent: Nov. 12, 2013

(54) METHOD FOR SKIN TONE DETECTION (75) Inventors: Abbas Cheddad, Londonderry (GB); Joan Condell, Coleraine (GB); Kevin Curran, Londonderry (GB); Paul McKevitt, Londonderry (GB)

(73) Assignee: University of Ulster, Coleraine (GB)

( * ) Notice: Subject to any disclaimer, the term of this patent is extended or adjusted under 35 U.S.C. 154(b) by 174 days.

(21) Appl. No.: 13/125,804

(22) PCT Filed: Oct. 20, 2009

(86) PCT No.: PCT/EP2009/007504
§ 371 (c)(1),
(2), (4) Date: Aug. 5, 2011

(87) PCT Pub. No.: WO2010/046082
PCT Pub. Date: Apr. 29, 2010

(65) Prior Publication Data
US 2011/0299771 A1 Dec. 8, 2011

(30) Foreign Application Priority Data

Oct. 23, 2008 (GB) .................................. 0819407.8
Oct. 31, 2008 (GB) .................................. 0819982.0

(51) Int. Cl.
*G06K 9/00* (2006.01)
(52) U.S. Cl.
USPC ............................ 382/165; 382/117; 382/118
(58) Field of Classification Search
None
See application file for complete search history.

(56) References Cited

U.S. PATENT DOCUMENTS 7,990,429 B2 * 8/2011 Saito .......................... 348/222.1

OTHER PUBLICATIONS

NPL—intle.com—Color models.*
NPL, A Cheddad et al. A skin tone detection algorithm for an adaptive approach to steganography, Signal Processing vol. 89, Issue 12, Dec. 2009, pp. 2465-2478.*
NPL—A Cheddad et al. A new colour space for skin tone detection, IEEE ICIP 2009, pp. 497-500.*
R. Etienne-Cummings et al.; "A vision chip for color segmentation and pattern matching", Eurasip Journal of Applied Signal Processing, vol. 7, Aug. 1, 2001, pp. 703-712, and Section 2. "Color segmentation and pattern matching", Fig. 3-5.
Kwangjin Hong et al; Partial Encryption of Digital Contents Using Face Detection Algorithm:, Aug. 7, 2006, Pricai 2006: Trends in Artificial Intelligence; [Lecture Notes in Computer Science], Springer Berlin Heidelberg, Berlin, Heidelberg, pp. 632-640, Section 2. "DCS System".
Y. Adachi et al.; "Detection of face direction from flesh and color and boundary images", In: "Knowledge-based intelligent information engineering. Systems and allied technologies", Sep. 1, 2002, IOS Press, pp. 770-775.

(Continued)

*Primary Examiner* — David Zarka
*Assistant Examiner* — Ha Le
(74) *Attorney, Agent, or Firm* — IpHorgan Ltd.

(57) ABSTRACT

There is described a method for detecting the presence of skin tone in an image. A gray scale representation of a pixel within the image is provided. Next, a red chrominance independent representation for is provided for the pixel. Then, the two representations are analysed to determine whether a difference in value between the representations corresponds with a the presence of a skin tone value. The present invention provides a rapid skin tone detection classifier particularly useful for real time applications.

18 Claims, 7 Drawing Sheets (56) References Cited

OTHER PUBLICATIONS

Brand J et al.; "A comparative assessment of three approaches to pixel-level human skin-detection", Pattern Recognition, 2000. Proceedings. 15th International Conference on Sep. 3-7, 2000; [Proceedings of the International Conference on Pattern Recognition. (ICPR)], Los Alamitos, CA., USA, IEEE Comput. Soc, US, vol. 1, Sep. 3, 2000, pp. 1056-1059.

European Patent Office (International Search Authority); International Search Report and Written Opinion, Patent Cooperation Treaty, PCT/EP2009/007504, Mar. 29, 2010.

* cited by examiner

METHOD FOR SKIN TONE DETECTION

CROSS-REFERENCE TO RELATED APPLICATIONS

This application claims priority to International Application No. PCT/EP2009/007504, filed on Oct. 20, 2009, which in turn claims priority to United Kingdom Patent Application Nos. 0819407.8 and 0819982.0, filed Oct. 23, 2008 and Oct. 31, 2008 respectively, the contents of which are all hereby incorporated by reference.

FIELD OF THE INVENTION

The present invention relates to a method for skin tone detection, and especially a method providing for real time colour transformation for effective skin tone detection.

BACKGROUND

Detecting human skin tone is used in numerous applications such as video surveillance, face and gesture recognition, human computer interaction, image and video indexing and retrieval, image editing, vehicle drivers' drowsiness detection, controlling users' browsing behaviour (e.g., surfing pornographic sites) etc.

Skin tone detection involves choosing a colour space, providing a skin model for the colour space and processing regions obtained from an image using the skin model to fit any specific application.

There exist several colour spaces including, for example, RGB, CMY, XYZ, xyY, UVW, LSLM, $L^*a^*b^*$, $L^*u^*v^*$, LHC, LHS, HSV, HSI, YUV, YIQ, YCbCr.

The native representation of colour images is typically the RGB colour space which describes the world view in three colour matrices: Red (R), Green (G) and Blue (B).

Some skin detection algorithms operate in this colour space, for example, Kovač, J., Peer, P., and Solina, F., (2003), "Human Skin Colour Clustering for Face Detection", EUROCON 2003 International Conference on Computer as a Tool, Ljubljana, Slovenia, September 2003 eliminate luminance by basing their approach on RGB components not being close together using the following rules:

An RGB pixel is classified as skin iff.

$R > 95 \& G > 40 \& B > 20$ $\& \max(R,G,B) - \min(R,G,B) > 15$ $\& |R-G| > 15 \& R > G \& R > B$ However, many colour spaces used for skin detection are based on linear transforms from RGB and many of these transformations are directed towards extracting luminance information from colour information to decorrelate luminance from the colour channels.

It is appreciated that the terms illumination and luminance are slightly different and indeed depend on each other. However, for simplicity, in the present specification, they are used interchangeably as each is a function of response to incident light flux or the brightness.

Some literature such as Albiol, A., Torres, L., and Delp, E. J. (2001), "Optimum color spaces for skin detection", Proceedings of the IEEE International Conference on Image Processing, vol. 1, 122-124 argue that choosing colour space has no implication on the detection given an optimum skin detector is used, in other words all colour spaces perform the same.

By contrast, others discuss in depth the different colour spaces and their performance including Martinkauppi J. B., Soriano M. N., and Laaksonen M. H. (2001), "Behavior of skin color under varying illumination seen by different cameras at different color spaces", In Proc. of SPIE vol. 4301, Machine Vision Applications in Industrial Inspection IX, pages 102-113, 2001; and Son Lam Phung, Bouzerdoum A., and Chai D., (2005), "Skin Segmentation Using Color Pixel Classification: Analysis and Comparison", IEEE Transactions on Pattern Analysis and Machine Intelligence, vol. 27, no. 1, pp. 148-154, January, 2005.

Furthermore, Abadpour A., and Kasaei S., (2005), "Pixel-Based Skin Detection for Pornography Filtering", Iranian Journal of Electrical & Electronic Engineering, IJEEE, 1(3): 21-41, July 2005 concluded that "in the YUV, YIQ, and YCbCr colour spaces, removing the illumination related component (Y) increases the performance of skin detection process".

Again however, by contrast Jayaram, S., Schmugge, S., Shin, M. C. and Tsap, L. V. (2004), "Effect of Colorspace Transformation, the Illuminance Component, and Color Modeling on Skin Detection", Proc of the 2004 IEEE Computer Vision and Pattern Recognition (CVPR'04) IEEE Computer Society conclude that the illumination component provides different levels of information for the separation of skin and non-skin color, thus absence of illumination does not help boost performance.

Hsu R.-L., Abdel-Mottaleb M. and Jain A. K. (2002), "Face detection in color images. IEEE Trans. Pattern Analysis and Machine Intelligence", vol. 24(5), 696-702, 2002; and Vezhnevets V., Sazonov V., and Andreeva A., (2003), "A Survey on Pixel-Based Skin Color Detection Techniques", Proc. Graphicon-2003, pp. 85-92, Moscow, Russia, September 2003 disclose dropping luminance prior to any processing as they indicate the mixing of chrominance and luminance data makes RGB based analysis marred and not a very favourable choice for colour analysis and colour based recognition.

Figure 1:
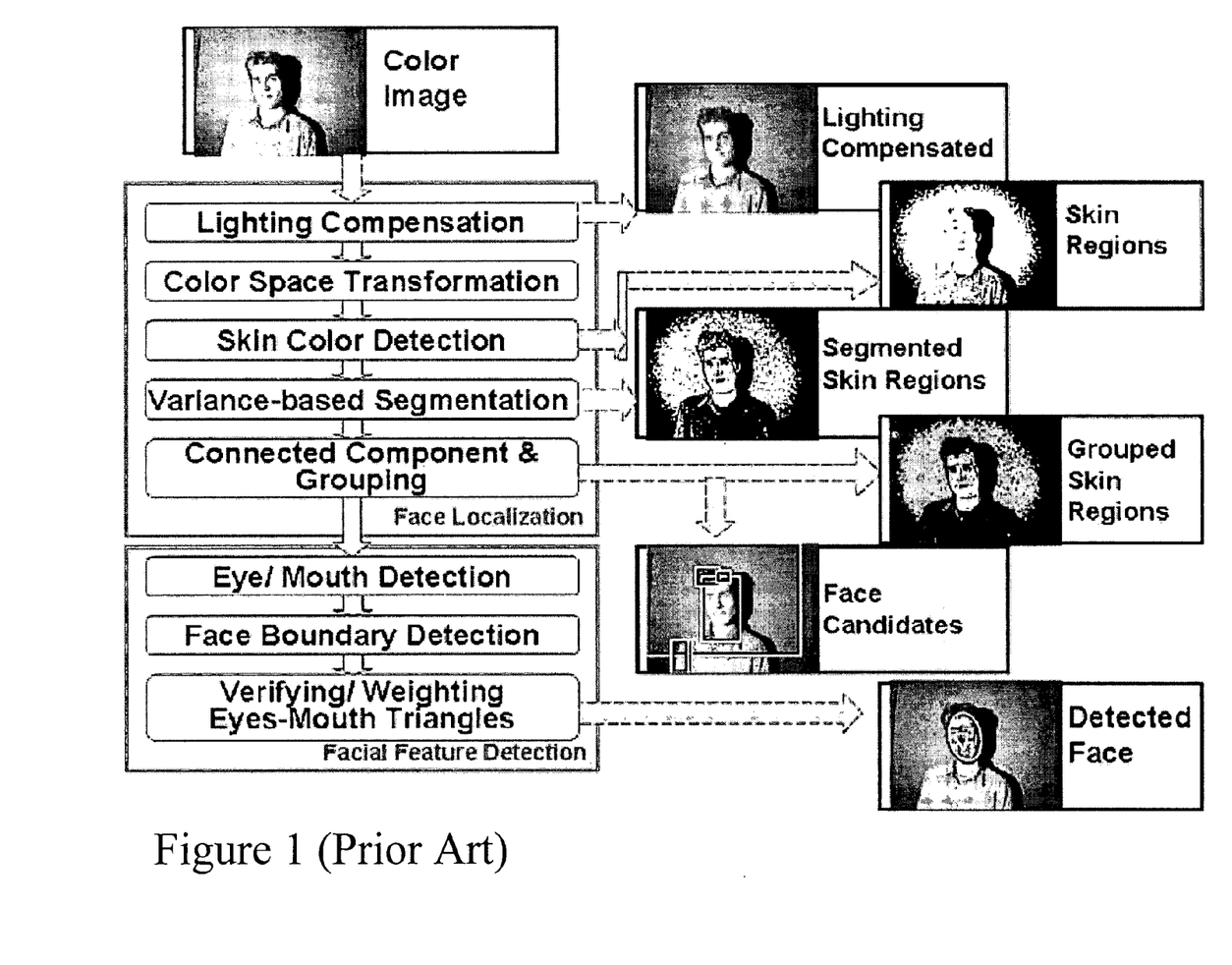
FIG. 1 is a schematic diagram of a prior art method of skin tone detection.

The approach of Hsu et al. is shown in more detail in FIG. 1. They use a model based on a concentration of human skin colour in CbCr space for face detection in colour images. As shown in FIG. 1, these two components were calculated after performing a lighting compensation using a "reference white" to normalise the colour appearance.

Yun Jae-Ung., Lee Hyung-Jin., Paul A. K., and Baek Joong-Hwan., (2007) "Robust Face Detection for Video Summary Using Illumination-Compensation and Morphological Processing", Third International Conference on Natural Computation, 710-714, 24-27 Aug. 2007, added an extra morphological step to the approach of Hsu et al.

Shin, M. C., Chang, K. I., and Tsap, L. V. (2002), "Does colorspace transformation make any difference on skin detection?" IEEE Workshop on Applications of Computer Vision argue and question the benefit of colour transformation for skin tone detection, e.g., RGB and non-RGB colour spaces; and also argue that the use of Orthogonal Colour Space (YCbCr) gives better skin detection results compared to seven other colour transformations.

Also, US 2005/0207643A1, Lee, H. J. and Lee, C. C., discloses clustering human skin tone in the YCbCr space.

Another space, the Log-Opponent (LO) space uses a base 10 logarithm to convert RGB matrices into I, $R_g$, $B_y$. The concept behind such hybrid colour spaces is to combine different colour components from different colour spaces to increase the efficiency of colour components to discriminate colour data.

In Forsyth, D. and Fleck, M. (1999), "Automatic Detection of Human Nudes", International Journal of Computer Vision 32(1): 63-77. Springer Netherlands, two spaces are used, namely $IR_gB_y$ and HS from the HSV (Hue, Saturation and Value) colour space. A texture amplitude map is used to find regions of low texture information. The algorithm first locates images containing large areas whose colour and texture is appropriate for skin, and then segregates those regions with little texture. The texture amplitude map is generated from the matrix I by applying 2D median filters.

Nonetheless, there remains a need to provide an improved method of skin tone detection.

SUMMARY OF THE INVENTION

According to the present invention there is provided a method of skin tone detection comprising the steps of:
- providing a gray scale representation of a pixel within an acquired image;
- providing a representation for said pixel which is independent of red chrominance; and
- determining whether a difference in value between said representations corresponds with a skin tone value.

The present invention provides a rapid skin tone detection classifier particularly useful for real time applications.

Preferably, said method comprises deriving said gray scale representation I by transforming RGB values normalised to the interval [0,1] for said pixel as follows:

$$I=(R*a)+(G*b)+(B*c),$$

wherein $0.25<a<0.35$, $0.5<b<0.7$, and $0.05<c<0.16$.

Example values which may be used could be:

$$I=R*0.2989360212937750+G*0.587043074451121+B*0.114020904255103$$

Preferably, said method comprises deriving said red chrominance independent representation from the maximum of the G and B values for said pixel.

Preferably, said determining comprises determining a skin tone value $f_{skin}(x,y)$ for a pixel as:

$$f_{skin}(x, y) = \begin{cases} 1 & \textit{iff} T_L < e(x, y) < T_H \\ 0 & \text{otherwise} \end{cases}$$

where $e(x,y)=I(x,y)-\hat{I}(x,y)$, and $T_L$ and $T_H$ are lower and upper threshold values, respectively.

It will be understood that $\hat{I}=\max(G,B)$

Preferably, $0.02<T_L<0.04$ and $0.10<T_H<0.14$.

Alternatively, $T_L$ and $T_H$ are calculated such that:

$$\mu-(\Delta_{left}*\sigma)=T_L$$

$$\mu+(\Delta_{right}*\sigma)=T_H$$

wherein $\mu$ is the mean of the frequency distribution of a series of pixels to be analysed, $\sigma$ is the standard deviation of said frequency distribution, and $\Delta_{left}$ and $\Delta_{right}$ right are chosen to be those values 1 and 3 $\sigma$ away from $\mu$ respectively.

Further preferably, $T_L=0.02511$ and $T_H=0.1177$.

Preferably, the method further comprises the step of determining one or more regions of skin tone in said image, each region comprising a plurality of contiguous pixels, each determined to have a value indicating the pixel has a skin tone.

In a further aspect there is provided a method of embedding data in an acquired image, the method comprising the steps of:
- identifying one or more skin tone regions within said acquired image; and
- embedding said data into at least a portion of said skin tone regions of said image.

Preferably, said embedding comprises embedding said data into a red chrominance channel of said image.

Further preferably, said method comprises performing a DWT transform of said image data prior to said embedding. DWT stands for a Discrete Wavelet Transform.

Preferably, said data is encrypted prior to said embedding to provide a substantially chaotic data set.

Further preferably, the method comprises the step of identifying within one of said skin tone regions a facial feature. Preferably, said facial feature comprises a pair of eyes. Further preferably, the method comprises the step of determining an orientation of said skin tone region in accordance with the relative rotation of said eyes within said acquired image.

Preferably, said data comprises adding an indication of said orientation to said image.

In a still further aspect, there is provided a method of extracting data embedded in an image according to the present invention, the method comprising:
- identifying one or more skin tone regions within said acquired image; and
- extracting said data from at least a portion of said skin tone regions of said image.

Preferably, said method comprises:
- identifying a relative rotation of a set of reference points within said acquired image;
- obtaining an indication of the relative rotation of said reference points within said acquired image when said data was embedded; and
- prior to said identifying, rotating said image so that said reference points conform to said indication.

BRIEF DESCRIPTION OF THE DRAWINGS

An embodiment of the invention will now be described, by way of example, with reference to the accompanying drawings, in which:

FIG. 7(a) shows a frequency distribution for a set of sample pixel data, with FIG. 7(b) showing the Gaussian curve fit for this sample data.

DESCRIPTION OF THE PREFERRED EMBODIMENT

An embodiment of the invention will now be described with reference to FIG. 2. In step 10, a grayscale image I is provided from an RGB image using the following ranges:

$$I=(R*a)+(G*b)+(B*c),$$

wherein 0.25<a<0.35, 0.5<b<0.7, and 0.05<c<0.16.

In particular, the following transformation is used:

$$I=R*0.298936021293775 0+G*0.587043074451121+B*0.114020904255103$$

This is similar to the RGB to Y transform into YCbCr colour space. In the embodiment, the RGB values are stored in double precision and linearly scaled in the interval [0,1]. The vector I eliminates the hue and saturation information while retaining the luminance.

Next, another version of luminance $\hat{I}$ is obtained, but this time without taking the R vector into account (most of skin colour tends to cluster in the red channel), step 12:

$$\hat{I}=\max(G,B)$$

The discarding of red colour is deliberate, as in the next stage this will help us calculate an error signal. This step is actually a modification of the way HSV (Hue, Saturation and Value) computes the V values, except that we do not include the red component in the calculation.

Then, step 14, for any value of x and y, an error signal e(x,y) is derived from the element-wise subtraction of the $\hat{I}$ and I matrices:

$$e(x,y)=I(x,y)-\hat{I}(x,y)$$

In the embodiment, e(x,y) does not employ either truncation or rounding.

Then a skin probability map (SPM) is determined from lower and upper boundaries, step 16. In an embodiment an empirical rule can be chosen as follows:

$$f_{skin}(x, y) = \begin{cases} 1 & \text{iff } 0.03 < e(x, y) < 0.13 \\ 0 & \text{otherwise} \end{cases}$$

Figure 7:
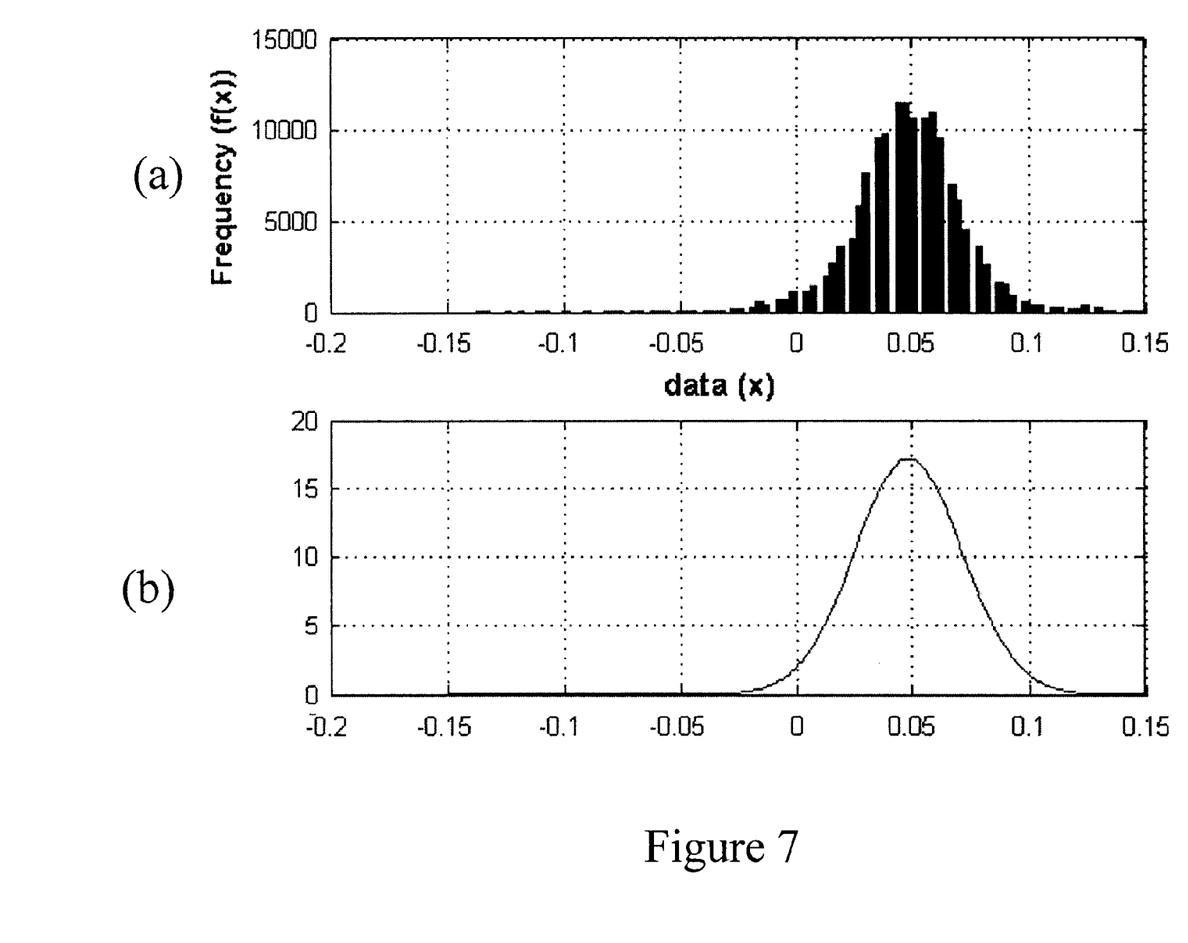

Most preferably, a skin probability map (SPM) is created that uses an explicit threshold based skin cluster classifier, which defines the lower and upper boundaries of the skin cluster. With reference to FIG. 7(a), a collection of 147 852 pixel samples were gathered from different skin regions exhibiting a range of races and with extreme variations in lighting effects. After transformation using the proposed method, the projection of data presents a distribution that could be easily fit into a Gaussian curve using expectation maximization (EM) methods, which is an approximation of Gaussian mixture models (GMM)—as shown in FIG. 7(b). From the graphs shown in FIG. 7, it is also clear that there are no other Gaussians hidden in the distribution.

A statistical analysis is performed to provide the detailed boundaries. Let μ and σ denote the mean and standard deviation of the above distribution, and let $\Delta_{left}$ and $\Delta_{right}$ denote the distances from μ, on the left and right hand side, respectively. The boundaries are determined based on:

$$\mu-(\Delta_{left}*\sigma) \approx 0.02511$$

$$\mu+(\Delta_{right}*\sigma) \approx 0.1177$$

where $\Delta_{left}$ and $\Delta_{right}$ right are chosen to be 1 and 3 σ away from μ, respectively, to cover the majority of the area under the curve. Hence, a more precise empirical rule set is given in $$f_{skin}(x, y) = \begin{cases} 1 & \text{if } 0.2511 < e(x, y) < 0.1177 \\ 0 & \text{otherwise} \end{cases} \quad (*)$$

Figure 3:
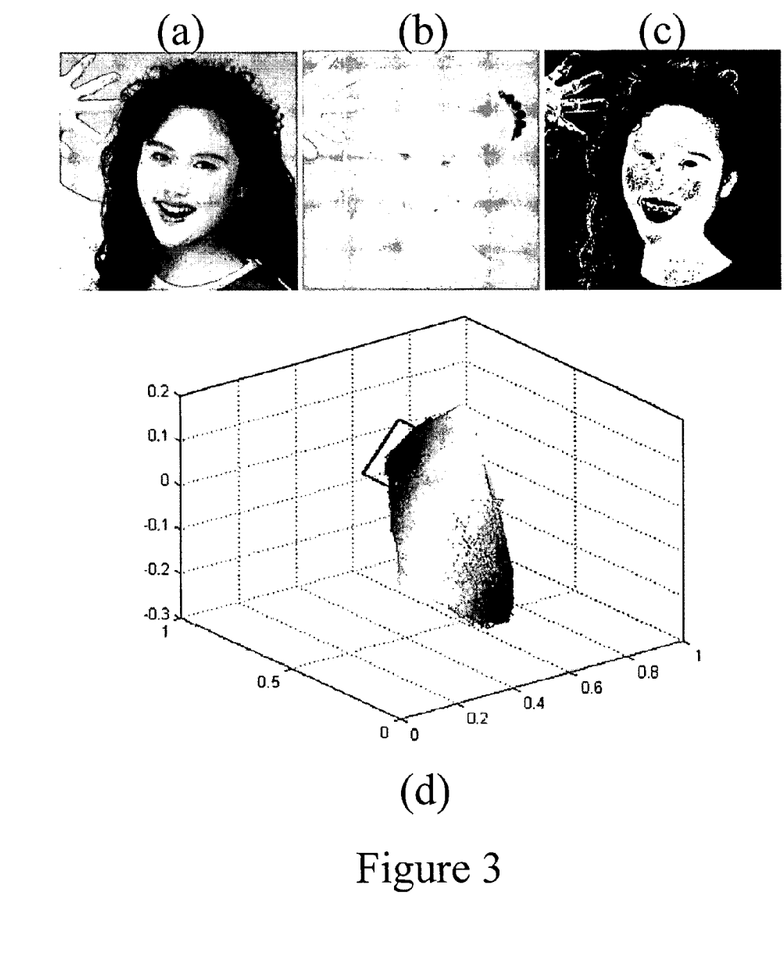
FIG. 3 shows the steps of skin tone segmentation using an embodiment of the present invention comprising: (a) original image; (b) error matrix e(x,y); (c) skin probability map (SPM); and (d) skin tone cluster in a 3D mesh.

It is proposed that the above rule provides a balanced threshold for further processing. While the inclusion of luminance is adopted, the 3D projection of the three matrices I(x),Î(x),e(x) in FIG. 3 shows that the skin tone clusters around the boundaries given in Eq. (*).

FIG. 3(a) shows an original image, FIG. 3(b) the corresponding error matrix, and FIG. 3(c) the corresponding SPM. FIG. 3(d) shows the transformed colour space—a rectangle is superimposed over that portion of the transformed colour space where skin colour tends to cluster. It can be seen that the skin tone region is relatively compact using the above method.

Skin tone detection according to the above embodiment finds particular application in steganography—the science of concealing the data in another transmission medium. Steganography has various applications for example as a replacement for encryption where it is prohibited or not appropriate, smart identifiers where individuals' details are embedded in their photographs (content authentication), data integrity by embedding checksum information into an image, medical imaging and secure transmission of medical data and bank transactions.

Conventional approaches to steganography can be categorized into three major areas:

algorithms in the spatial domain, for example, Brown, A. 1996, *S-Tools* (http://www.jjtc.com/Security/stegtools.htm);

algorithms in the transform domain for example, Westfeld, A. 2001, F5 (http://wwwrn.inf.tu-dresden.de/~westfeld/f5.html); and algorithms taking an adaptive approach combined with one of the former two methods for example ABCDE (A Block-based Complexity Data Embedding), as disclosed in Hioki H. (2002), "A Data Embedding Method Using BPCS Principle with New Complexity Measures", Proceedings of the Pacific Rim Workshop on Digital Steganography, pp. 30-47.

Most existing steganographic methods rely on two factors: the secrecy of the key used to encode the hidden data prior to embedding and the robustness of the steganographic algorithm. Nonetheless, all of the above tools along with the majority of other introduced techniques suffer from intolerance to any kind of geometric distortion applied to the stego-image—the carrier image including the hidden steganographic information. For instance, if rotation or translation occurs all of the hidden information can be lost.

An implementation of the present invention, remedies this problem by finding clusters of skin areas in a carrier image, step 18. This can be based on conventional region growing algorithms starting from seed skin pixels determined in the previous step 16. It has been found that embedding data into these regions produces less distortion to the carrier image compared to embedding in a sequential order or in any other areas. This is because when information is embedded in such regions, it is psycho-visually redundant, i.e. the eye does not respond with as much sensitivity to information in these regions as in others, and so the carrier image can be altered in these regions without significantly impairing the quality of image perception.

Figure 2:
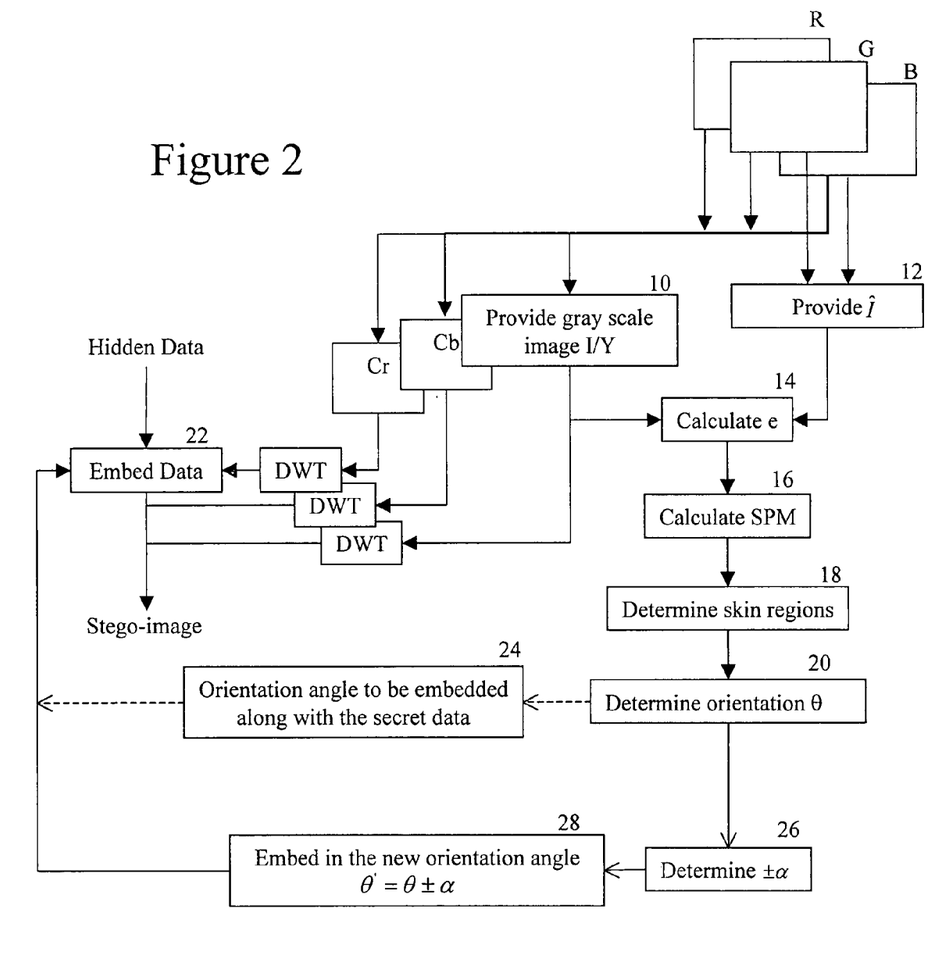
FIG. 2 is a flow diagram illustrating a method of skin tone detection according to an embodiment of the present invention.

In a decoder (not shown) arranged to extract hidden data from a carrier image produced according to the method of FIG. 2, skin regions are extracted based on colour tone and hidden data is then extracted from those regions. The data hidden in such images is therefore undisturbed by translation, and can be recovered from such images.

In one implementation, to cope with rotation, at encoding, FIG. 2, the skin regions identified in step 18 can be further analysed to locate and determine the orientation of specific reference points, for example, face features as described in Cheddad, A., Mohamad D. and Abd Manaf, A. (2008), "Exploiting Voronoi Diagram Properties in Face Segmentation and Features Extraction", Pattern Recognition 41 (12) 3842-3859, Elsevier Science.

Figure 4:
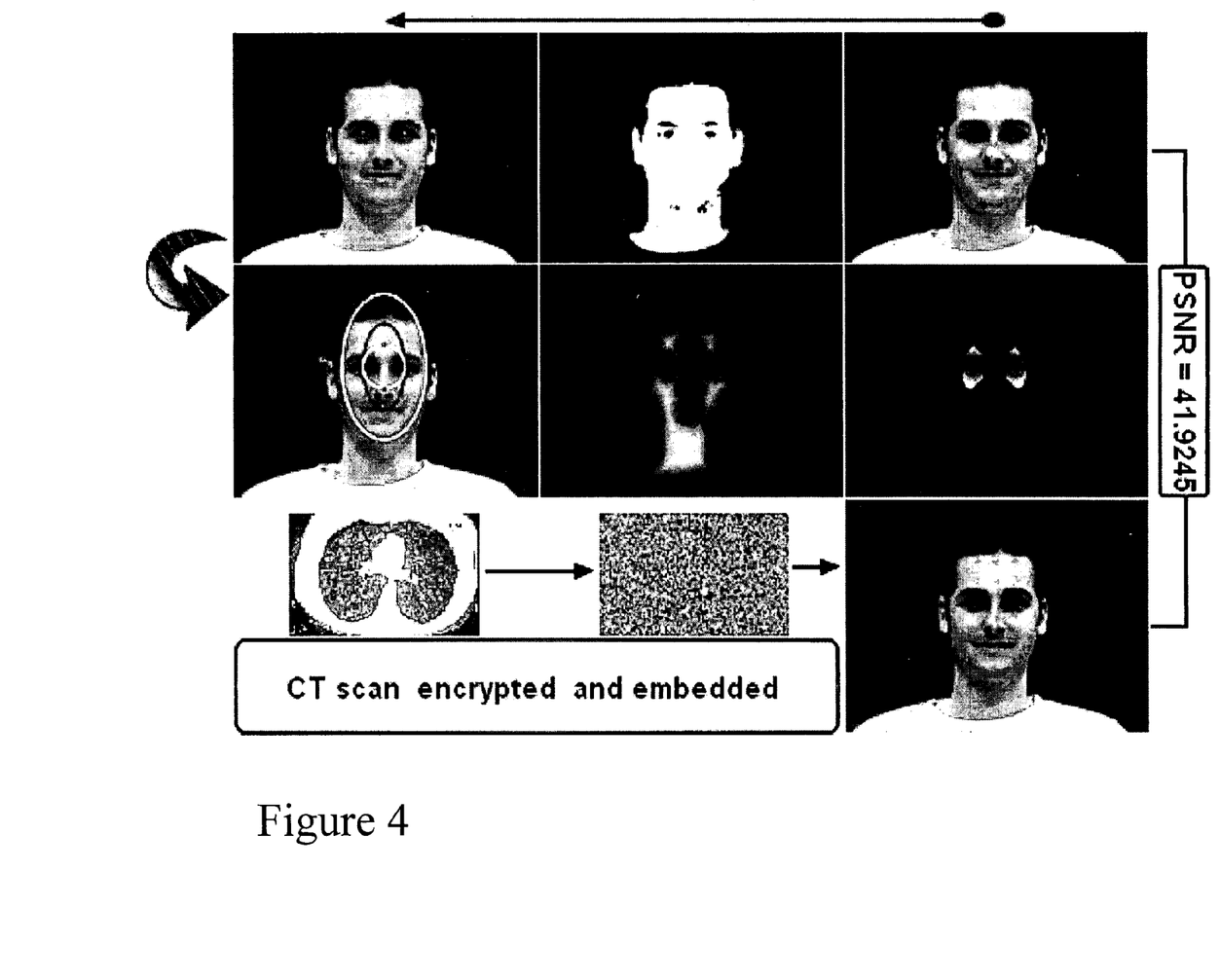
FIG. 4 shows a skin based steganography system according to an embodiment of the present invention.
Figure 5:
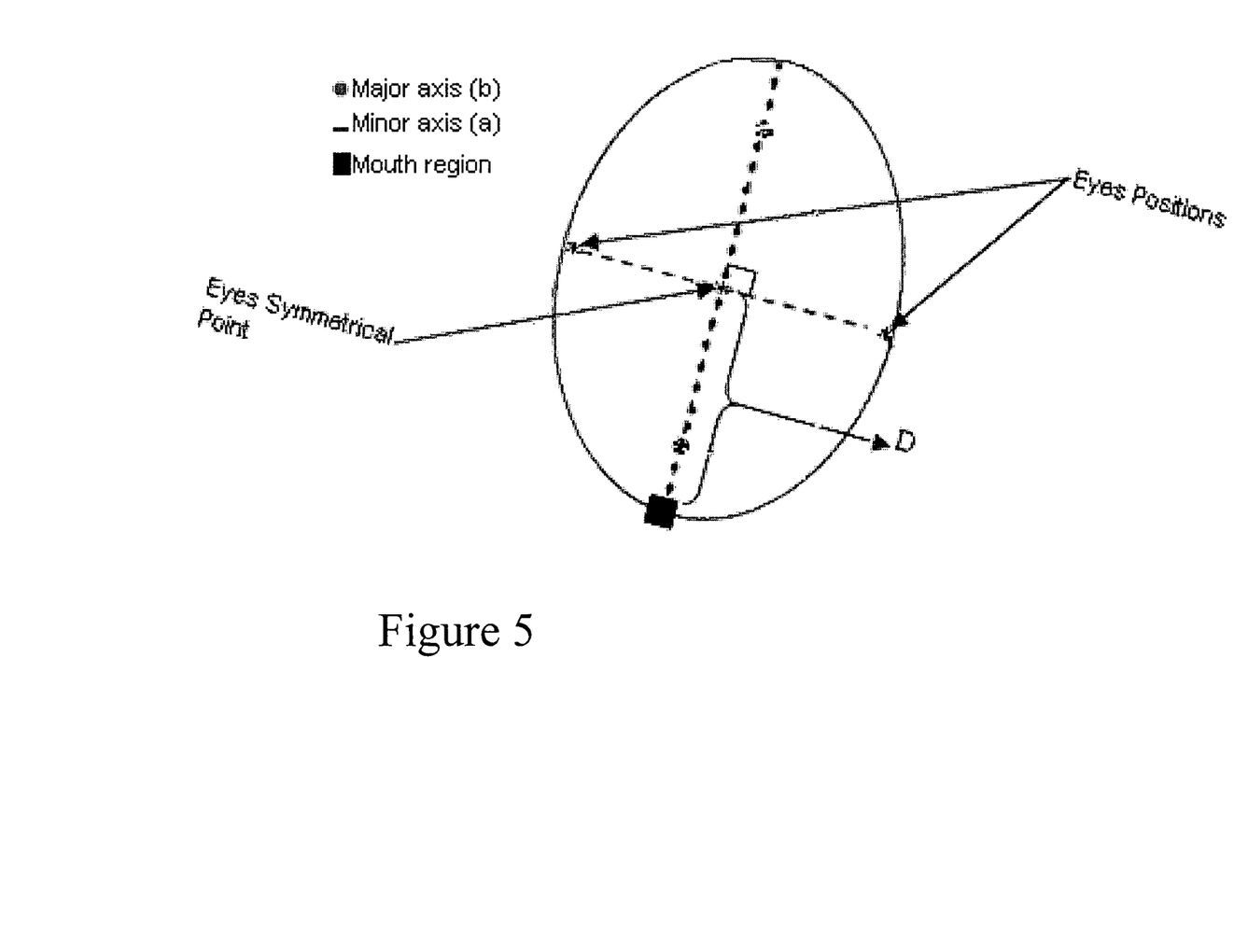
FIG. 5 shows an elliptical model for a face.

So as shown in FIG. 4, starting with an image at the top right, a skin map (top middle) is generated as described in relation to steps 10-18; then as shown in the middle row, a pair of eyes can be identified. These form the reference points and their relative position within the image dictates the orientation of a face within the carrier image, step 20. This is shown in FIG. 5 as the angle θ In this case, the hidden data is from a medical CT scan (bottom left) which has been encrypted (bottom middle) and this is embedded within the image, step 22.

Figure 6:
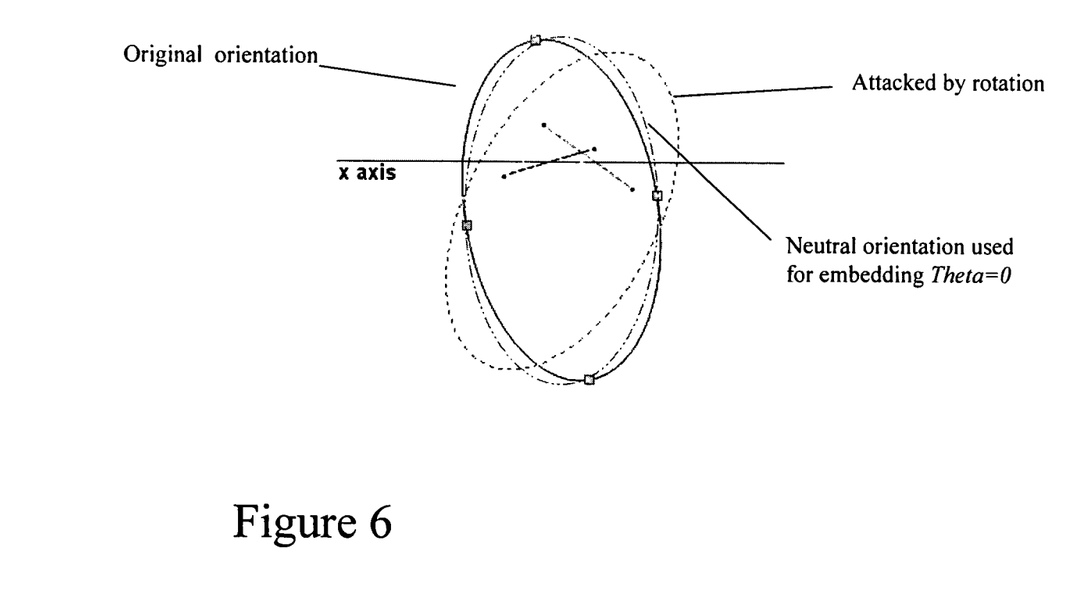
FIG. 6 shows a graphical simulation of oriented embedding.

Turning now to FIG. 6, it will be seen that for an image including a face region having an original orientation (in this tilted towards the left), a rotation of the image (in this case, clockwise through an upright position so that it tilts towards the right) would cause a complex mapping of pixels within the image and so a loss or distortion of the hidden data.

However, if the original orientation angle of the face is included with the image, step 24, then even if an image has been subjected to a rotation attack, as a pre-processing step prior to decoding, the attacked image can be rotated in the opposite direction by the required angle to re-orient the face region to an angle θ and so restore the relative coordinates of skin regions within the image.

In a further refinement of this approach, the angle θ can be modified with a secret key α∈{1, 2, . . . , 359}, wherein the secret key α is an agreed-upon angle for embedding that is shared between the sender and the recipient (i.e. between the encoder and the decoder), step 28. The secret key α can be determined in any conventional manner, step 26, by the parties transmitting and decoding the hidden data, so that on decoding the image, the angle θ can be determined and used to re-orient the image if required.

For example, the original image containing a face region is initially inspected, and is found to form an angle of, say, 1.5° to the base. Having knowledge of the agreed angle key α, say 90°, the original image is rotated by 88.5° (i.e. 90°−1.5°). The bit stream is then embedded in the rotated original image, step 28. The resultant image is then re-oriented to the initial angle of the face region in the original image, i.e. 1.5° (1.5°−90°=a rotation of −88.5°. (This would be in the form of an additional step after step 22, not shown in FIG. 2.) This then forms the encrypted image for transmission, which can be sent to the intended recipient who, having knowledge of the agreed angle key α, can use the steps of the above-described method to recover the embedded data.

It is appreciated that embedding the calculated angle θ with the payload is very fragile to any image processing attack and in alternative implementations; the angle θ can be transmitted by alternative means or channels. For example, in JPEG images, the angle θ could be included in the EXIF image header and so could be unaffected by a rotation attack.

In any case, knowledge of the orientation of reference points within an image when data is embedded aids recovery from rotation distortion.

In a preferred embodiment, embedding of the stego-image takes place in the 1st-level 2D Haar DWT (Discrete Wavelet Transform) with the Symmetric-padding mode to resist noise impulse and compression. Although algorithms based on DWT experience some losses of data since the reverse transform truncates the values if they go beyond the lower and upper boundaries (i.e., 0-255), knowing that human skin tone resides along the middle range in the chromatic red of YCbCr colour space allows us to embed in the DWT of the Cr channel, leaving the perceptibility of the carrier image virtually unchanged.

The invention is not limited to the embodiments described herein but can be amended or modified without departing from the scope of the present invention.

The invention claimed is:

1. A method of skin tone detection comprising the steps of:
   providing a gray scale representation of a pixel within an acquired image;
   providing a representation for said pixel which is independent of red chrominance channel, wherein said representation which is independent of red chrominance channel is derived from the maximum of the G and B values for said pixel; and
   determining whether a difference in value between said representations corresponds with a skin tone value.

2. The method of claim 1, wherein the method comprises deriving said gray scale representation I by transforming RGB values normalised to the interval [0,1] for said pixel as follows:

$$I=(R*a)+(G*b)+(B*c),$$

wherein $0.25<a<0.35$, $0.5<b<0.7$, and $0.05<c<0.16$.

3. The method of claim 1, wherein the method further comprises the step of determining one or more regions of skin tone in said image, each region comprising a plurality of contiguous pixels, each determined to have a value indicating the pixel has a skin tone.

4. A method of embedding data in an acquired image, the method comprising the steps of:
   identifying one or more skin tone regions within said acquired image as claimed in claim 3; and
   embedding said data into at least a portion of said skin tone regions of said image.

5. The method of claim 4, wherein the step of embedding comprises embedding said data into a red chrominance channel of said image.

6. The method of claim 4, wherein said method comprises performing a DWT transform of said image data prior to said embedding.

7. The method of claim 4, wherein the method further comprises the step of encrypting said data prior to said embedding to provide a substantially chaotic data set.

8. The method of claim 4, wherein the method comprises the step of identifying within one of said skin tone regions a facial feature.

9. The method of claim 8, wherein said facial feature comprises a pair of eyes.

10. The method of claim 9, wherein the method comprises the step of determining an orientation of said skin tone region in accordance with the relative rotation of said eyes within said acquired image.

11. The method of claim 10, wherein said data comprises adding an indication of said orientation to said image.

12. A method of skin tone detection comprising the steps of:
   providing a gray scale representation of a pixel within an acquired image;
   providing a representation for said pixel which is independent of red chrominance channel; and
   determining whether a difference in value between said representation corresponds with a skin tone value
   wherein the determining comprises determining a skin tone value $f_{skin}(x,y)$ for a pixel as:

$$f_{skin}(x, y) = \begin{cases} 1 & \text{if } T_L < e(x, y) < T_H \\ 0 & \text{otherwise} \end{cases}$$

where $e(x,y)=I(x,y)-\hat{I}(x,y)$, $I(x,y)$ denotes said gray scale representation of a pixel within an acquired image, $\hat{I}(x, y)$ denotes said representation for said pixel which is independent of red chrominance channel, and $T_L$ and $T_H$ are lower and upper threshold values, respectively.

13. The method of claim 12, wherein $0.02 < T_L < 0.04$ and $0.10 < T_H = < 0.14$.

14. The method of claim 12, wherein $T_L$ and $T_H$ are calculated such that:

$$\mu - (\Delta_{left} * \sigma) = T_L,$$

$$\mu + (\Delta_{right} * \sigma) = T_H$$

wherein $\mu$ is the mean of the frequency distribution of a series of pixels to be analysed, $\sigma$ is the standard deviation of said frequency distribution, and $\Delta_{left}$ and $\Delta_{right}$ right are chosen to be those values 1 and 3 $\sigma$ away from $\mu$ respectively.

15. The method of claim 12, wherein $T_L=0.02511$ and $T_H=0.1177$.

16. A method of extracting data embedded in an image, the method comprising the steps of:
   identifying one or more skin tone regions within said acquired image by:
   providing a gray scale representation of a pixel within an acquired image;
   providing a representation for said pixel which is independent of red chrominance channel, wherein said representation which is independent of red chrominance channel is derived from the maximum of the G and B values for said pixel; and
   determining whether a difference in value between said representations corresponds with a skin tone value;
   wherein the method further comprises the step of determining one or more regions of skin tone in said image, each region comprising a plurality of contiguous pixels, each determined to have a value indicating the pixel has a skin tone; and
   extracting data from at least a portion of said skin tone regions of said image.

17. The method of claim 16, wherein the method comprises:
   identifying a relative rotation of a set of reference points within said acquired image;
   obtaining an indication of the relative rotation of said reference points within said acquired image when said data was embedded; and
   prior to said identifying, rotating said image so that said reference points conform to said indication.

18. A computer program product comprises a non-transitory computer readable medium on which computer instructions are stored which when executed in a computing device are arranged to perform the steps of:
   providing a gray scale representation of a pixel within an acquired image; providing a representation for said pixel which is independent of red chrominance channel, wherein said representation which is independent of red chrominance channel is derived from the maximum of the G and B values for said pixel; and
   determining whether a difference in value between said representations corresponds with a skin tone value.

\* \* \* \* \*